(12) United States Patent
Ante et al.

(10) Patent No.: US 8,419,334 B2
(45) Date of Patent: Apr. 16, 2013

(54) MAGNETIZED NUT FOR FASTENING A COMPRESSOR WHEEL OF AN EXHAUST TURBOCHARGER TO THE TURBO SHAFT, AND METHOD FOR THE PRODUCTION THEREOF

(75) Inventors: Johannes Ante, Regensburg (DE); Stephan Heinrich, Pfeffenhausen (DE); Markus Herrmann, Regensburg (DE); Andreas Ott, Steinsberg (DE); Denny Schädlich, Neustadt (DE)

(73) Assignee: Continental Automotive GmbH, Hannover (DE)

( * ) Notice: Subject to any disclaimer, the term of this patent is extended or adjusted under 35 U.S.C. 154(b) by 414 days.

(21) Appl. No.: 12/663,796

(22) PCT Filed: May 19, 2008

(86) PCT No.: PCT/EP2008/056097
§ 371 (c)(1),
(2), (4) Date: Dec. 9, 2009

(87) PCT Pub. No.: WO2008/151905
PCT Pub. Date: Dec. 18, 2008

(65) Prior Publication Data
US 2010/0178132 A1    Jul. 15, 2010

(30) Foreign Application Priority Data
Jun. 13, 2007   (DE) .......................... 10 2007 027 235

(51) Int. Cl.
*F16B 37/00* (2006.01)

(52) U.S. Cl.
USPC ............................................. 411/432; 470/2

(58) Field of Classification Search ............... 411/424, 411/432, 303; 470/2, 18
See application file for complete search history.

(56) References Cited

U.S. PATENT DOCUMENTS

| 4,549,157 | A  | * | 10/1985 | Loubier ......................... 335/303 |
| 4,924,674 | A  | * | 5/1990  | Hara et al. ...................... 60/608 |
| 5,890,857 | A  | * | 4/1999  | Herrera ........................... 411/11 |
| 5,945,758 | A  | * | 8/1999  | Goltz et al. ...................... 310/90 |
| 6,462,450 | B1 | * | 10/2002 | Haussecker et al. ..... 310/156.09 |
| 7,112,958 | B2 | * | 9/2006  | Yamada et al. ........... 324/207.25 |
| 2005/0017709 | A1 | | 1/2005 | Stolfus et al. |
| 2007/0075703 | A1 | | 4/2007 | Biber et al. |
| 2008/0115570 | A1 | * | 5/2008 | Ante et al. ................. 73/114.77 |
| 2009/0290988 | A1 | * | 11/2009 | Ante et al. ................. 416/244 A |
| 2010/0026284 | A1 | * | 2/2010 | Ante et al. ..................... 324/226 |
| 2010/0209256 | A1 | * | 8/2010 | Ante et al. ................. 416/244 R |

FOREIGN PATENT DOCUMENTS

| DE | 10 2005 029764 | 1/2007 |
| DE | 10 2005 054 839 | 5/2007 |
| DE | 10 2005 054839 | 5/2007 |

(Continued)

*Primary Examiner* — Flemming Saether
(74) *Attorney, Agent, or Firm* — Cozen O'Connor

(57) ABSTRACT

A magnetized nut for fastening a compressor wheel of an exhaust turbocharger to a turbo shaft. The nut has a base body made of a non-magnetic material forming a hollow space for accommodating a magnetic material, and a method for the production of the magnetized nut. In order to provide a magnetized nut that is produced in a simple and cost-effective manner and ensures as equal a distribution of mass as possible with regard to the rotational axis of the nut, the magnetic material is introduced into the hollow space using injection molding.

11 Claims, 3 Drawing Sheets

FOREIGN PATENT DOCUMENTS

| | | |
|---|---|---|
| DE | 10 2006 044 667 | 3/2008 |
| JP | 10 206447 | 8/1998 |
| JP | 102 06 447 | 8/1998 |
| WO | WO 2006/045680 | 5/2006 |

* cited by examiner

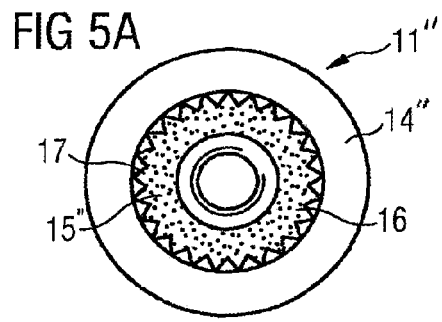
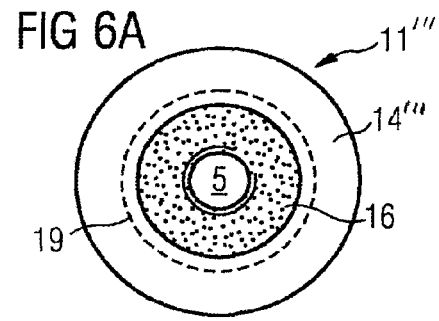
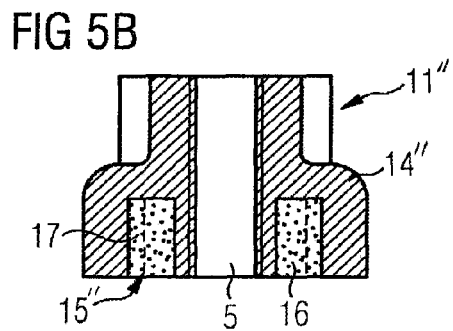
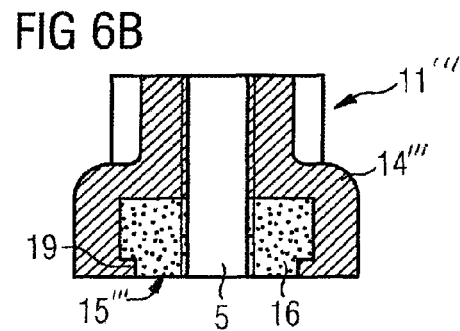
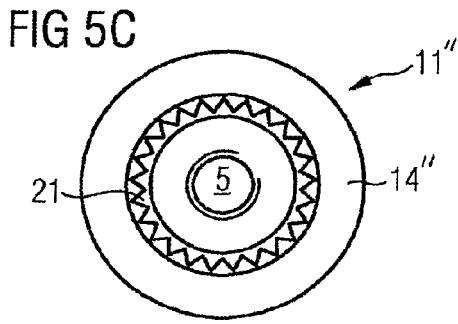
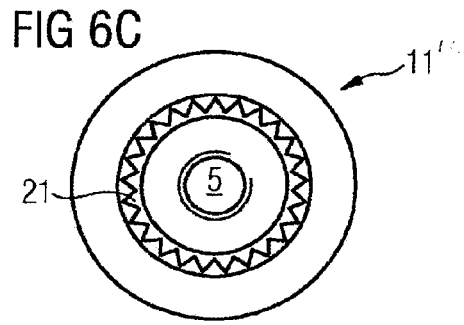
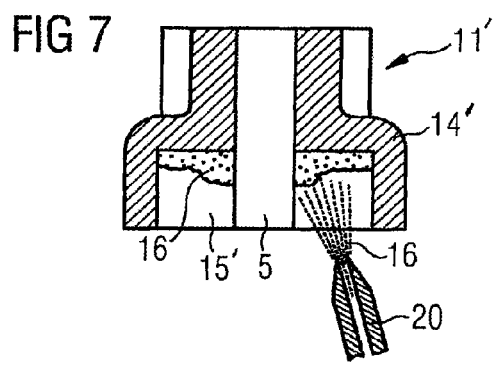

MAGNETIZED NUT FOR FASTENING A COMPRESSOR WHEEL OF AN EXHAUST TURBOCHARGER TO THE TURBO SHAFT, AND METHOD FOR THE PRODUCTION THEREOF

PRIORITY CLAIM

This is a U.S. national stage of application No. PCT/EP2008/056097, filed on 19 May 2008, which claims Priority to the German Application No. 10 2007 027 235.0, filed on 13 Jun. 2007 the contents of both being incorporated herein by reference.

BACKGROUND OF THE INVENTION

1. Field of the Invention

The invention relates to a magnetized nut for fastening a compressor wheel of an exhaust turbocharger to the turbo shaft, the nut having a body made from a non-magnetic material, which forms a hollow space for accommodating a magnetic material, and to a method for manufacturing the magnetized nut.

2. Related Art

The power output generated by an internal combustion engine depends upon the air mass and the quantity of fuel that can be delivered to the engine for combustion. To boost the power output of the internal combustion engine it is necessary to increase the quantity of delivered combustion air and fuel. This increase in the power output is achieved, in the case of a naturally aspirated engine, by an increase in swept volume or by increasing the engine speed. An increase in swept volume leads to heavier, dimensionally larger and hence more expensive internal combustion engines. The increase in engine speed, particularly in larger internal combustion engines, brings considerable problems and disadvantages and is limited for technical reasons.

A solution commonly used to boost the power output of an internal combustion engine is supercharging. By this we mean the pre-compression of the combustion air by an exhaust turbocharger or also by a compressor mechanically driven by the engine. An exhaust turbocharger basically comprises a flow compressor and a turbine, which are connected to a common turbo shaft and rotate at the same speed. The turbine converts the normally wasted energy of the exhaust gas into rotational energy that drives the compressor.

The compressor draws fresh air in and delivers the compressed air to the individual cylinders of the engine. A greater quantity of fuel can be fed to the larger quantity of air in the cylinders, so that the internal combustion engine delivers more power. This furthermore has a beneficial effect on the combustion process, so that the internal combustion engine achieves a better overall efficiency. In addition it is possible to design an internal combustion engine supercharged by a turbocharger with an extremely favorable torque profile. Standard production engines of vehicle manufacturers can be substantially improved through the use of an exhaust turbocharger without making major design changes to the internal combustion engine. Supercharged internal combustion engines generally have a lower specific fuel consumption and lower pollutant emissions. Turbocharged engines are furthermore quieter than naturally aspirated engines of equal output, since the exhaust turbocharger itself acts as an additional silencer.

For internal combustion engines having a larger operating speed range, such as automobile internal combustion engines, a higher boost pressure is required even at low engine speeds.

For this purpose a boost pressure control valve, a so-called wastegate valve, is introduced. By selecting a corresponding turbo housing, a high boost pressure is rapidly built up even at low engine speeds. As the engine speed increases the boost pressure control valve (wastegate valve) then limits the boost pressure to a constant value. Alternatively turbochargers having a variable turbine geometry (VTG) are used. In these turbochargers the boost pressure is regulated by varying the turbine geometry.

With an increasing quantity of exhaust gas the maximum admissible combined speed of the turbine wheel, the compressor wheel, and turbo shaft, also referred to as the rotor of the turbocharger, may be exceeded. If the maximum admissible speed of the rotor is exceeded, the rotor would be destroyed, which is tantamount to a total loss of the turbocharger. Small, modern turbochargers with significantly smaller turbine and compressor wheel diameters, which have an improved rotational acceleration response due to their considerably smaller mass moment of inertia, are particularly susceptible to the problem associated with an exceeding of the admissible top speed. Depending on the type of turbocharger, simply exceeding the rotational speed limit by about 5% leads to complete destruction of the turbocharger.

Boost pressure control valves, which in the state of the art are actuated by a signal resulting from the boost pressure generated, have proved successful in limiting the speed. If the boost pressure exceeds a predefined threshold, the boost pressure control valve opens and causes a portion of the exhaust gas mass flow to bypass the turbine. Due to the reduced exhaust gas mass flow this takes up less power and the compressor output diminishes a similar degree. The boost pressure and the speed of the turbine wheel and the compressor wheel are reduced. This control reaction is relatively slow because the pressure build-up when the rotor exceeds the admissible speed ensues with a time lag. For this reason, particularly in the highly dynamic range (load reversal), the speed control for the turbocharger with boost pressure monitoring must intervene through a correspondingly premature reduction in boost pressure, which leads to an efficiency loss.

DE 10 2006 044 667.4 discloses a turbocharger having an element generating a magnetic field, in which the speed of the turbo shaft is registered by an active sensor element. The element generating the magnetic field is embodied as a magnetized nut for fastening a compressor wheel of an exhaust turbocharger to the turbo shaft. The magnetized nut has a body of a non-magnetic material, which forms a hollow space for accommodating a magnetic material. The magnetic material takes the form of a sintered permanent magnet, which is adhesively bonded or welded into the hollow space. Bonding or welding the permanent magnet in is intricate and leads to unbalanced mass distributions in the magnetized nut. Since the nut rotates together with the turbo shaft at very high speed, even minute defects in the equal distribution of the mass have an extremely detrimental effect.

SUMMARY OF THE INVENTION

An object of the present invention is therefore to specify a magnetized nut, which is easy and cost-effective to manufacture, the intention being to ensure an optimum equal distribution of the mass about the rotational axis of the nut.

According to one embodiment of the invention this object is achieved in that the magnetic material is inserted into the hollow space using an injection molding method.

The magnetized nut is very easy to manufacture, because there is no need to bond or to weld a sintered permanent magnet into the body. Furthermore, the imbalances created by bonding or welding in the sintered permanent magnet do not occur in the magnetized nut according to the invention. Moreover, in the manufacture of the magnetized nut according to the invention any unequal mass distributions present in the body about the rotational axis of the magnetized nut, which is identical to the rotational axis of the turbo shaft, can be compensated for by the magnetic material injected. The magnetic material can be used to balance the nut, which represents a significant advantage compared to magnetized nuts in the state of the art.

In one embodiment of the invention, the hollow space is of annular configuration. This configuration of the hollow space allows a quantity of the magnetic material to be injected and it is possible to distribute the magnetic material in an appropriate quantity inside the hollow space to balance the magnetized nut.

In one embodiment of the invention the hollow space has an undercut. The undercut prevents the magnetic material falling out of the hollow space once it has been injected into this space and has solidified.

In a further development, which may also advantageously be combined with that previously mentioned, the hollow space on at least one of its walls has a circumferential toothing and/or the hollow space on at least one of its walls has a rough surface. These measures serve to fix the injected magnetic material securely in the hollow space.

In one development the magnetic material is epoxy-bonded NdFeeB powder. Epoxy-bonded NdFeeB powder is easy to inject and sets very firmly and durably in the hollow space. In addition it lends itself to magnetization, so that the magnetized nut can generate a magnetic field of high field strength.

The method includes the body being inserted into an injection mold and the magnetic material being injected into the hollow space. This is a very cost-effective and efficient method, producing a magnetized nut of high quality. The magnetized nut is very easy to manufacture because there is no need to bond or to weld a sintered permanent magnet into the body. Furthermore, the imbalances created by bonding or welding in the sintered permanent magnet do not occur in the method for manufacturing a magnetized nut according to the invention.

In one development, the injection of the magnetic material produces an optimum equal distribution of the mass in the magnetized nut about the rotational axis of the magnetized nut. Any unequal mass distributions occurring in the body can be purposely balanced.

In one development unequal mass distributions of the body about the rotational axis of the magnetized nut are compensated for by the injection of the magnetic material. The injection method according to the invention can thereby be used to balance the nut, which represents a significant advantage compared to the method for manufacturing magnetized nuts in the state of the art.

BRIEF DESCRIPTION OF THE DRAWINGS

Embodiments of the invention are represented by way of example in drawings, in which:

FIG. 5a, is another embodiment of a magnetized nut from below;

FIG. 5b Is the magnetized nut of FIG. 5a in lateral section;

FIG. 5c Is the magnetized nut of FIG. 5a from above;

FIGS. 6a, 6b, 6c: is another embodiment of a magnetized nut from below;

FIG. 6b Is the magnetized nut of FIG. 6a in lateral section;

FIG. 6c Is the magnetized nut of FIG. 6a from above;

FIG. 7: is a schematic representation of a method for manufacturing the magnetized nut.

DETAILED DESCRIPTION OF THE DRAWINGS

Figure 1:
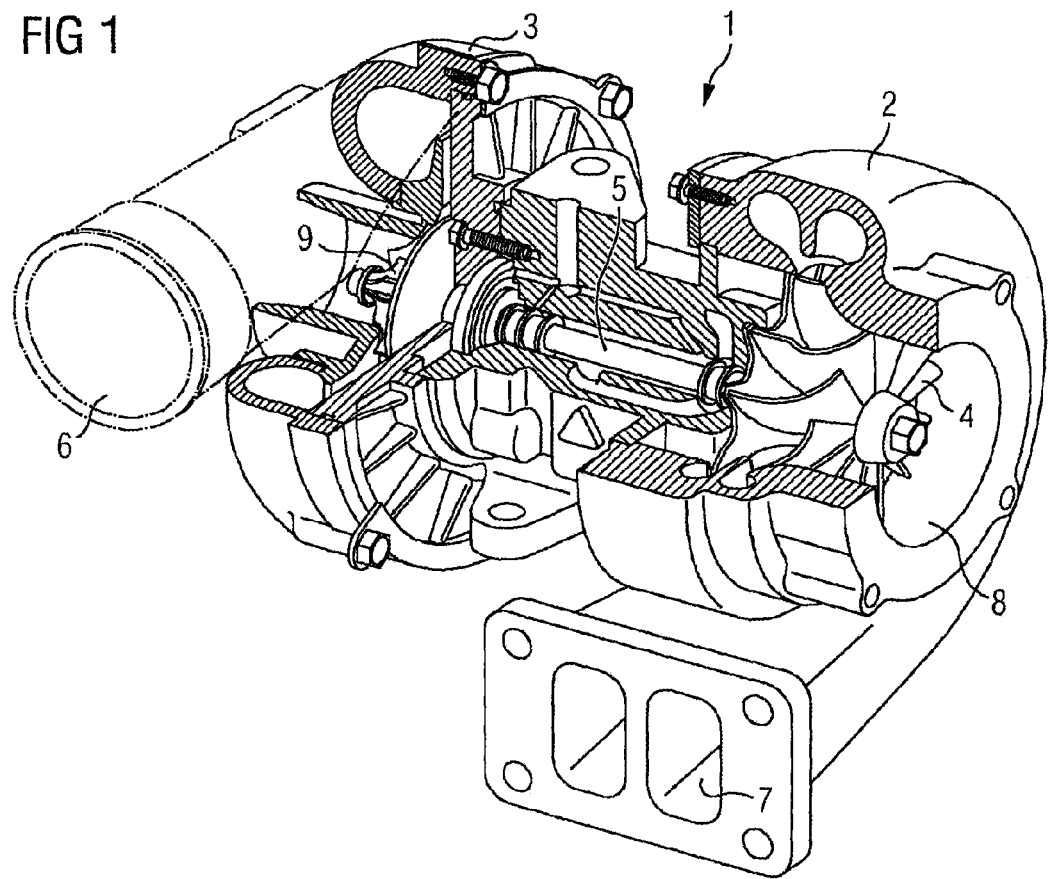
FIG. 1 is a perspective view of an exhaust turbocharger.

FIG. 1 is an exhaust turbocharger 1 comprising a turbine 2 and a compressor 3. The compressor wheel 9 is rotatably supported in the compressor 3 and is connected to the turbo shaft 5. The turbo shaft 5 is also rotatably supported and is connected at its other end to the turbine wheel 4. Hot exhaust gas from an internal combustion engine, not shown here, is admitted into the turbine 2 via the turbine inlet 7, setting the turbine wheel 4 in rotation. The exhaust gas flow leaves the turbine 2 through the turbine outlet 8. The turbine wheel 4 is connected to the compressor wheel 9 by way of the turbo shaft 5. The turbine 2 thereby drives the compressor 3. Air is drawn into the compressor 3 through the air inlet 10 (FIG. 2) and is then compressed in the compressor 3 and fed via the air outlet 6 to an internal combustion engine, not shown here.

Figure 2:
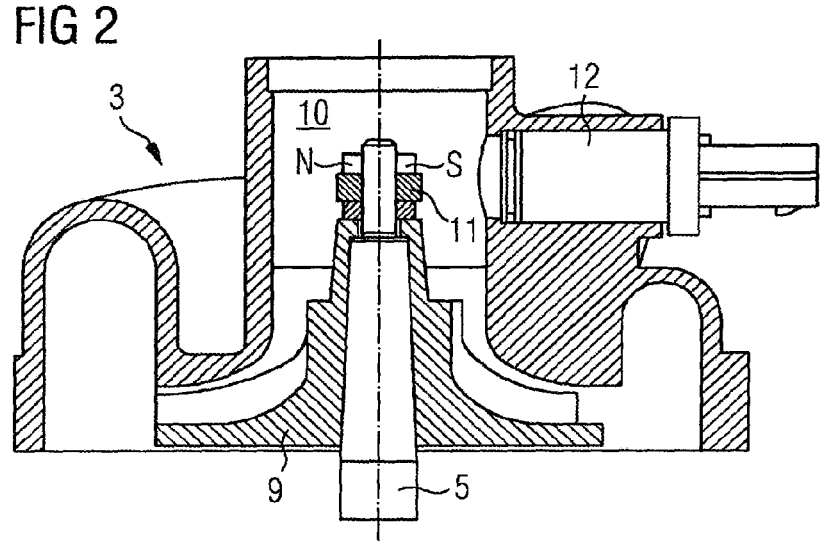
FIG. 2 is a cross section of an exhaust turbocharger with a sensor for measuring the speed of the turbo shaft in the state of the art.

FIG. 2 shows the compressor 3 of an exhaust turbocharger 1 with a sensor 12 for measuring the speed of the turbo shaft 5. The exhaust turbocharger 1 comprises a turbo shaft 5, on which the compressor wheel 9 is arranged. The compressor wheel 9 is connected to the turbo shaft 5 by a magnetized nut 11. The rotational axis of the magnetized nut 11 is identical to that of the turbo shaft 5. Situated in the magnetized nut 11 is a sintered permanent magnet, which has a north pole N and a south pole S. The permanent magnet is bonded or welded into a hollow space in the body of the magnetized nut 11. As the turbo shaft 5 rotates the magnetized nut 11 with the magnet also rotates, causing the magnetic field generated by the north and south poles to vary in relation to the sensor 12. The sensor 12 is arranged as a separate component in a recess of the compressor housing. For this purpose a seal is provided, which seals off the compressor housing in the area of the sensor 12.

Figure 3:
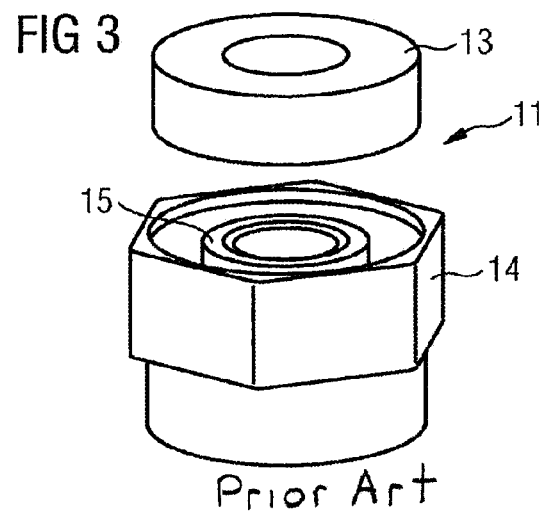
FIG. 3 is a prospective view of a prior art magnetized nut.

FIG. 3 is a magnetized nut 11. The body 14' of the magnetized nut 11 has a hollow space 15, into which the sintered permanent magnet 13 is bonded or welded. The magnetized nut 11 manufactured in this way requires extensive finishing work, since the bonded, sintered permanent magnet 13 generally produces an imbalance in the magnetized nut 11. Since the magnetized nut 11 rotates at very high speed with the turbo shaft 5 about their rotational axis, any mass imbalance, however small, will generate forces acting on the turbo shaft 5. Such imbalances cause damage in the bearings of the turbo shaft 5, which can only be avoided if the mass imbalance on the turbo shaft 5 is balanced out. It is therefore desirable to manufacture all parts rotating together with the turbo shaft 5 with an optimum equal distribution of the mass about the rotational axis. This is achieved by the method according to the invention for manufacturing the magnetized nuts 11. Magnetized nuts 11', 11" and 11'" manufactured by the method are represented in FIGS. 4 to 6.

Figure 4A:
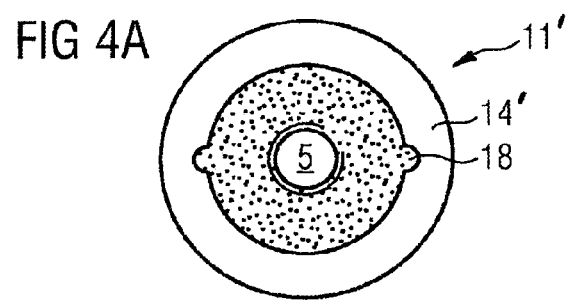
FIG. 4a, is a magnetized nut according to an embodiment of the invention viewed from below.

FIG. 4a shows a magnetized nut 11' viewed from below. The magnetized nut 11' comprises a body 14' with a hollow space 15', into which the magnetic material 16 has been injected. To secure the magnetic material 16 in place the body 14' comprises lugs 18, in which the set magnetic material 16 is firmly anchored. The possibility of the magnetic material 16 rotating relative to the body 14' is thereby excluded. The magnetic material 16 can be injected such that all unequal mass distributions of the magnetized nut 11' about the rotational axis of the turbo shaft 5 are eliminated.

Figure 4B:
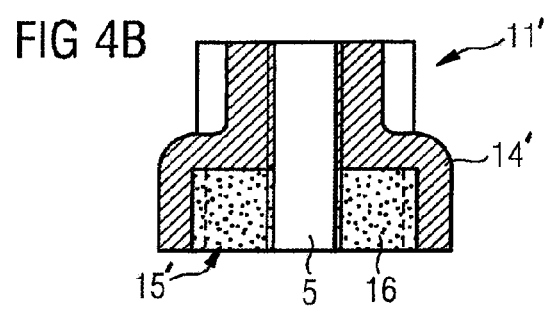
FIG. 4b is the magnetized nut of FIG. 4a in lateral section.

FIG. 4b is a lateral section through the magnetized nut 11'. FIG. 4b shows the turbo shaft 5 with the rotational axis, about which the body is formed in an axially symmetrical manner. The body 14' has a hollow space 15', into which the magnetic material 16 is injected.

Figure 4C:
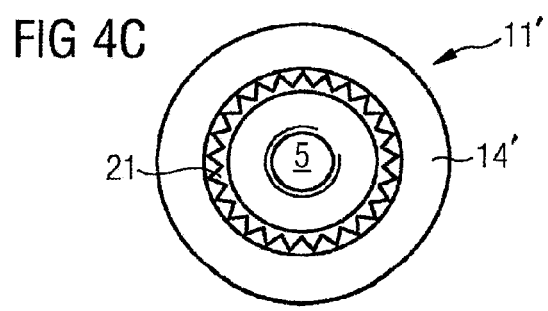
FIG. 4c is the magnetized nut of FIG. 4a from above.

FIG. 4c shows the magnetized nut 11' viewed from above. This again shows the body, in which a meshing engagement 21 is formed for a turning tool (not shown here). For example the meshing engagement 21 shown here is for a torx wrench, any other type of meshing engagement for a turning tool being feasible.

FIGS. 5a-5c shows a further embodiment of the magnetized nut 11", FIG. 5a again representing the view from beneath. The body 14" has a hollow space 15", into which the magnetic material 16 has been injected. To fix the magnetic material 16 in the hollow space 15" a toothing 17 is formed on the outer wall of the hollow space 15". In the injection process the magnetic material 16 adapts its shape to conform to the toothing 17. The magnetic material 16 is thereby securely fixed in place in the hollow space 15" of the magnetized nut 11".

FIG. 5b shows a side view of the magnetized nut 11" shown in FIG. 5a. It shows the body 14" with the hollow space 15", in which the magnetic material 16 is introduced. In this magnetized nut 11" the magnetic material 16 does not extend up to the turbo shaft 5. The hollow space 15" forms a partition between the magnetic material 16 and the turbo shaft 5.

FIG. 5c shows the top view of the magnetized nut 11". The meshing engagement 21 is again designed for a torx wrench. With a torx meshing engagement 21 it is possible to transmit particularly high tightening torques to the magnetized nut 11".

FIG. 6a shows the top view of a third embodiment of the magnetized nut 11'''. It shows the body 14''' with the hollow space 15''' and the magnetic material 16 that has been introduced therein. Also indicated is an undercut 19, which is again designed to secure the magnetic material 16 in place in the hollow space 15'''.

FIG. 6b also shows the undercut 19, which is formed on the body 14'''. After setting, the magnetic material 16 introduced in the hollow space 15''' is firmly fixed in the hollow space 15''' of the body 14 by the undercut 19 and cannot slip out of this space.

FIG. 6c shows the top view of the magnetized nut 11''' with the meshing engagement 21 for a torque wrench.

The method for manufacturing the magnetized nut 11''' is represented schematically in FIG. 7. The body 14''' has the familiar space 15''' shown in FIGS. 4 to 6, into which the magnetic material 16 is injected. The injection molding nozzle 20 can be guided so that the unequal distributions of the mass of the magnetized nut 11''' about the rotational axis of the turbo shaft 5 are balanced, both the introduction of the magnetic material 16 into the magnetized nut 11''' and the balancing of the mass distribution of the magnetized nut 11''' about the rotational axis of the turbo shaft being accomplished in one production stage. The method according to the invention makes it possible to manufacture an outstandingly balanced magnetized nut 11''' very rapidly and cost-effectively.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A balanced magnetized nut configured for fastening a compressor wheel of an exhaust turbocharger to a turbo shaft, the magnetized nut comprising:
   a body made from a non-magnetic material, the body having a hollow space with an undercut formed therein; and
   a magnetic material inserted into the hollow space configured to compensate an imbalance in the body and balance the magnetized nut,
   wherein the magnetic material is inserted in the hollow space by injection molding.

2. The magnetized nut as claimed in claim 1, wherein the hollow space is configured as an annular space.

3. The magnetized nut as claimed in claim 2, wherein the hollow space is formed with at least one wall, the at least one wall further comprising a rough surface.

4. The magnetized nut as claimed in claim 2, wherein the magnetic material is epoxy-bonded NdFeeB powder.

5. The magnetized nut as claimed in claim 1, wherein the hollow space is formed with at least one wall, the at least one wall further comprising a rough surface.

6. The magnetized nut as claimed in claim 1, wherein the magnetic material is epoxy-bonded NdFeeB powder.

7. A method for manufacturing a magnetized nut for fastening a compressor wheel of an exhaust turbocharger to a turbo shaft, the nut having a body made from a non-magnetic material, the body having formed therein a hollow space configured to accommodate a magnetic material, the method comprising:
   inserting a previously formed body into an injection mold; and
   injecting the magnetic material into the hollow space.

8. The method for manufacturing a magnetic nut as claimed in claim 7, wherein the injection of the magnetic material is configured to produce an equal distribution of mass in the magnetized nut about the rotational axis of the magnetized nut.

9. The method for manufacturing a magnetized nut as claimed in claim 7, further comprising compensating for an unequal mass distribution of the body about the rotational axis of the magnetized nut by the injection of the magnetic material.

10. The method for manufacturing a magnetized nut as claimed in claim 8, further comprising compensating for an unequal mass distribution of the body about the rotational axis of the magnetized nut by the injection of the magnetic material.

11. The method for manufacturing a magnetized nut as claimed in claim 7, wherein the magnetic material is epoxy-bonded NdFeeB powder.

* * * * *